United States Patent [19]

Nomura et al.

[11] Patent Number: 4,722,020
[45] Date of Patent: Jan. 26, 1988

[54] BRUSHLESS D.C. MOTOR HAVING ABNORMAL DRIVING CURRENT CUT-OFF CIRCUIT

[75] Inventors: Masaaki Nomura; Satoshi Kondoh; Shingo Nakanishi, all of Obu, Japan

[73] Assignee: Aisan Kogyo Kabushiki Kaisha, Obu, Japan

[21] Appl. No.: 894,125

[22] Filed: Aug. 8, 1986

[30] Foreign Application Priority Data

Sep. 27, 1985 [JP] Japan ............. 60-148700[U]

[51] Int. Cl.$^4$ ............................. H05H 7/085
[52] U.S. Cl. ............................. 361/31; 361/30; 361/33
[58] Field of Search ............... 361/23, 30, 31, 33; 318/563, 565

[56] References Cited

FOREIGN PATENT DOCUMENTS 159675  9/1983  Japan .................. 361/23

Primary Examiner—A. D. Pellinen
Assistant Examiner—Derck S. Jennings
Attorney, Agent, or Firm—Dennison, Meserole, Pollack & Scheiner

[57] ABSTRACT

The safety circuit of the present invention is connected to a drive control circuit for applying driving signals to a plurality of switching devices connected to respective stator coils of the brushless D.C. motor at a predetermined timing, and sequentially supplying a driving current to each phase of the stator cells. The safety circuit is adapted to simultaneously detect the driving signals and generate a cut-off signal for cutting off the driving current supplied to each of the stator coils in the event that the driving signals are simultaneously applied to the switching devices in controlling a driving operation of the brushless D.C. motor.

2 Claims, 4 Drawing Figures

BRUSHLESS D.C. MOTOR HAVING ABNORMAL DRIVING CURRENT CUT-OFF CIRCUIT

BACKGROUND OF THE INVENTION (1) Field of the Invention

The present invention relates to a three phase brushless D.C. motor mounted in a fuel supply pump for an automobile, for example. More particularly, it relates to an abnormal driving current cut-off circuit which interrupts current to the brushless D.C. motor, in the event that more than two stator coils are simultaneously energized.

(2) Description of the Prior Art

FIG. 3 shows a conventional drive control circuit for a three-phase brushless D.C. motor. As may be seen, three position sensors MP for detecting a magnetic pole position of a rotor RO magnetized by a permanent magnet are arranged adjacent the outer periphery of the rotor RO at the intervals of 120 degrees, and output signals from the position sensors MP are fed into a position detecting circuit MPC. The position detecting circuit MPC converts the output signals from the position sensors MP to logic "1" signals, for example, and supplies the logic signals to a three-phase logic LC. In accordance with the magnetic pole position signals generated from the position detecting circuit MPC, the three-phase logic LC supplies driving signals DS from a first-phase output terminal $\phi1$, a second-phase output terminal $\phi2$ and a third-phase output terminal $\phi3$ through resistors R1, R2 and R3 to transistors TR1, TR2 and TR3, respectively, at the output timing of each phase as shown in FIG. 4. The transistors TR1, TR2 and TR3 are turned on every time the driving signals DS generated from the three-phase logic LC are supplied to each base of the transistors. As a result, driving current for the brushless D.C. motor is sequentially supplied from a power supply +B to each of three stator coils SC to thereby rotate the rotor RO.

Diodes D1, D2 and D3 are connected to each of the stator coils SC in parallel, so as to absorb surge of the stator coils SC.

In the conventional drive control circuit for the brushless D.C. motor, when the three-phase logic LC is affected by an external noise or the like, the driving signals DS are sometimes generated quite randomly without following the regular output timing shown in FIG. 4. As a result, there is a possibility of the driving signals DS being generated simultaneously from the first-phase output terminal $\phi1$ and the second-phase output terminal +2 of the three-phase logic LC, for example. In this case, as the transistors TR1 and TR2 simultaneously turn on, driving current is simultaneously supplied to the first-phase stator coil and the second-phase stator coil.

When the driving current is simultaneously supplied to the plural stator coils, the stator coil of such a phase as should originally not be supplied with the driving current acts as a load to cause a reduction in rotational speed of the rotor RO and undue power consumption.

SUMMARY OF THE INVENTION

Accordingly, it is an object of the present invention to provide an abnormal driving current cut-off circuit adapted for discontinuing abnormal rotation of the brushless D.C. motor and preventing undue power consumption.

According to the present invention, in a drive control circuit for generating driving signals for a brushless D.C. motor at a predetermined output timing and for controlling switching devices for feeding driving current to stator coils of the brushless D.C. motor, an abnormal driving current cut-off circuit comprises a detecting circuit for detecting the driving signals, and an output circuit for generating a signal for switching off the switching devices when the detecting circuit detects the driving signals simultaneously in the event that the driving signals are simultaneously generated from the drive control circuit.

In operation, when the driving signals are simultaneously fed to the plural switching devices from the drive control circuit, the driving signals are simultaneously detected by the abnormal driving current cut-off circuit to generate the cut-off signal. The cut-off signal is used to turn off the switching devices for feeding the driving current to each of the stator coils, or to open a power supply circuit for supplying a driving current to each of the stator coils, thereby cutting off the driving current supplied to each of the stator coils.

The invention will be more fully understood from the following detailed description and appended claims when taken with the drawings.

DETAILED DESCRIPTION OF THE PREFERRED EMBODIMENTS

Figure 1:
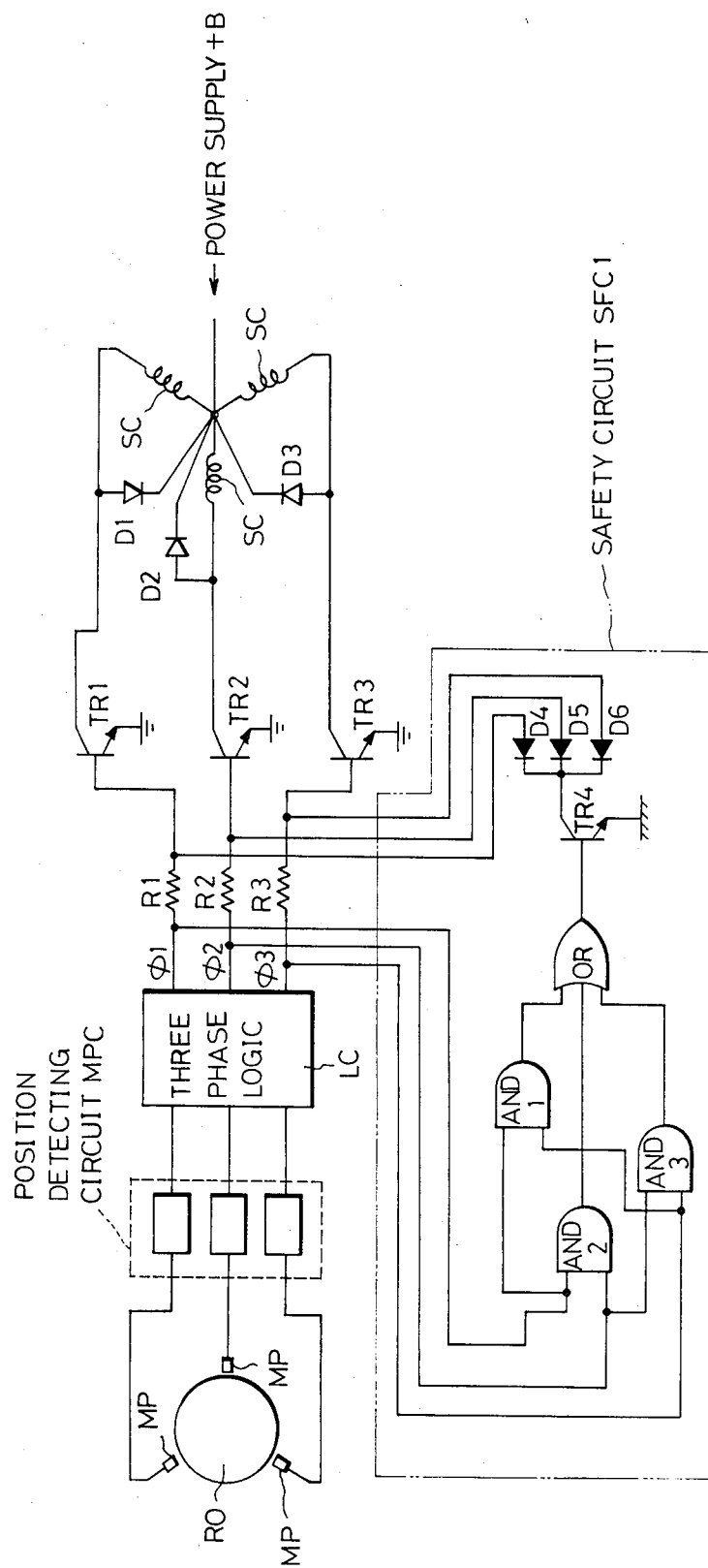
FIG. 1 is a diagram of a brushless D.C. motor having an abnormal driving current cut-off circuit according to a preferred embodiment of the present invention.
Figure 3:
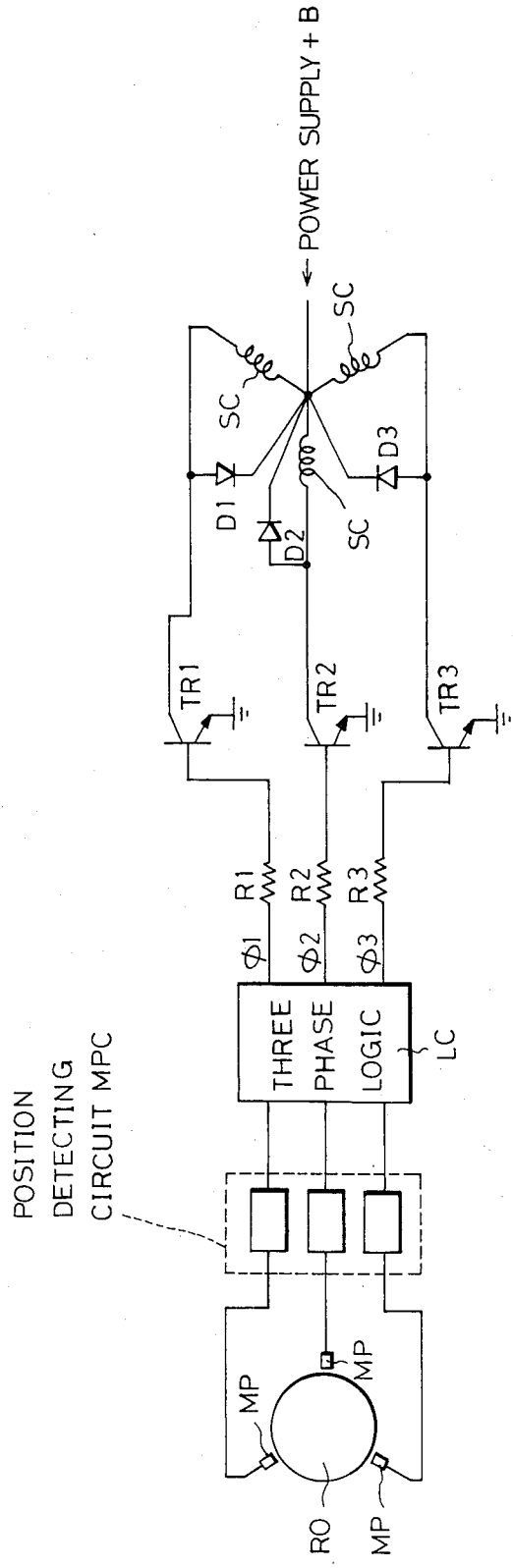
FIG. 3 is a diagram of a conventional three phase brushless D.C. motor.

Referring to FIG. 1, an abnormal driving current cut-off circuit SFC1 is connected to the conventional drive control circuit for the three-phase brushless D.C. motor shown in FIG. 3. Specifically, the first-phase output terminal $\phi1$ of the three-phase logic LC is connected to each one of input terminals of two-input AND gates AND 1 and AND 2. The second-phase output terminal $\phi2$ is connected to the other input terminal of the two-input AND gates AND2 and one of input terminals of a two-input AND gate AND3. The third-phase output terminal $\phi3$ is connected to the other input terminal of the two-input AND gate AND3 and the other input terminal of the two-input AND gate AND1.

Output terminals of the two-input AND gates AND1, AND2 and AND3 are connected to respective input terminals of a three-input OR gate OR. An output terminal of the three-input OR gate OR is connected to a base of an NPN type transistor TR4. An emitter of the transistor TR4 is connected to a 0 volt terminal of a power supply +B.

A collector of the transistor TR4 is connected to cathodes of three diodes D4, D5 and D6. Anodes of the diodes D4, D5 and D6 are connected to the bases of the transistors TR1, TR2 and TR3, respectively.

Figure 4:
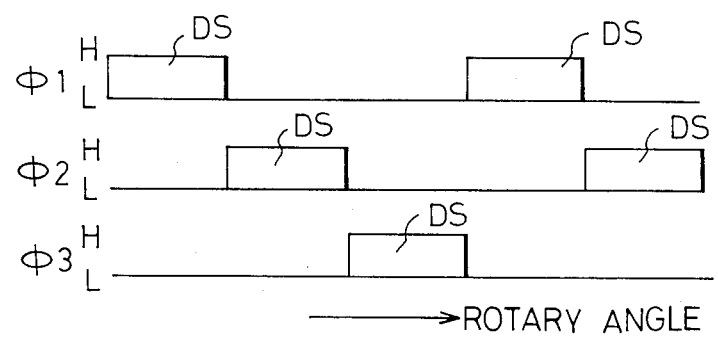
FIG. 4 is an output timing chart of the driving signals for a brushless D.C. motor.

In the case that the driving signals DS are generated from the first-phase output terminal $\phi1$ of the three-phase logic LC through the resistor R1 to the base of the transistor TR1 at the output timing shown in FIG. 4 to turn on the transistor TR1 to allow the driving current to be supplied from the power supply +B to the first-phase stator coil SC, it is assumed that an external noise is applied to the three-phase logic LC to affect the operation of circuit elements in the three-phase logic LC, and consequently the driving signals DS are simultaneously generated from the first-phase output terminal $\phi 1$ and the second-phase output terminal $\phi 2$, for example.

Under the above condition, both the transistors TR1 and TR2 simultaneously turn on to allow the driving current to be simultaneously supplied to both the first-phase and second-phase stator coils. In this abnormal case, as the first-phase stator coil is properly supplied with current, but the second-phase stator coil should originally not be supplied with current, the latter acts as a kind of load of the former to reduce rotational speed of the rotor RO and output torque thereof.

The abnormal driving current cut-off circuit SFC1 is provided to relieve the aforementioned condition. When the driving signals DS are simultaneously output from the first-phase output terminal $\phi 1$ and the second-phase output terminal $\phi 2$ of the three-phase logic LC, a logic "1" signal is fed to the two input terminals of the two-input AND gate AND2, which in turn outputs a logic "1" signal to the three-input OR gate OR. Then, the three-input OR gate OR outputs a logic "1" signal.

As a result, the transistor TR4 turns on, and each base of the transistors TR1, TR2 and TR3 is grounded through diodes D4, D5 and D6 and transistor TR4. Accordingly, all of the transistors TR1, TR2 and TR3 is turned off to hinder driving current from being fed from the power supply +B to each of the stator coils SC.

When the influence of the external noise to the three-phase logic LC is eliminated, a normal driving current is sequentially fed to each of the stator coils at a normal timing.

In the aforementioned embodiment, the two-input AND gate AND2 generates a logic "1" when the external noise affects the three-phase logic LC, and the driving signals are simultaneously output from the first-phase and second-phase output terminals $\phi 1$ and $\phi 2$ of the three-phase logic LC. Similarly, in the case that the second-phase output terminal $\phi 2$ of the three-phase logic LC is a normal driving signal output terminal, and that an abnormal driving signal is output from the third-phase output terminal $\phi 3$, the two-input AND gate AND3 generates a logic "1". Further, in the case that the third-phase output terminal $\phi 3$ is a normal driving signal output terminal, and that an abnormal signal is output from the first-phase output terminal $\phi 1$, the two-input AND gate AND1 generates a logic "1". As a result, the transistors TR1, TR2 and TR3 are turned off in each case as mentioned above.

Figure 2:
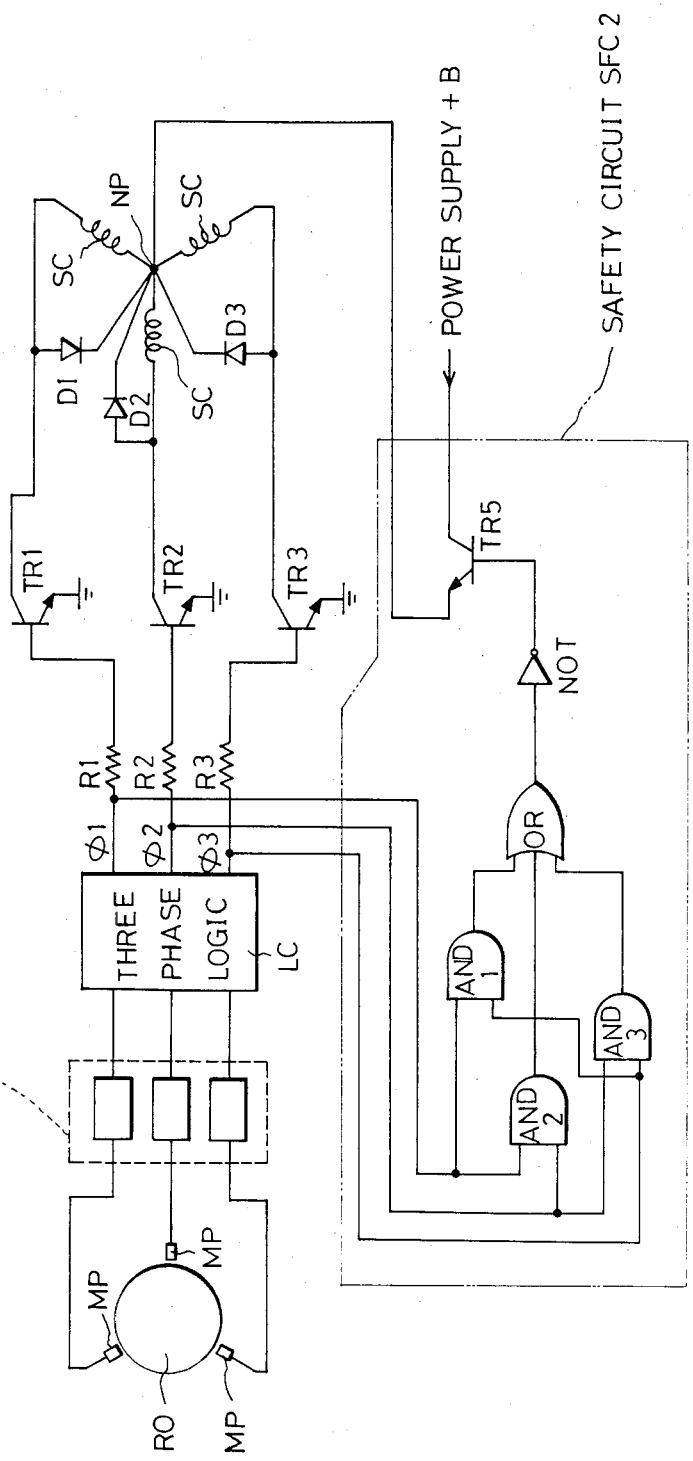
FIG. 2 is a diagram of a brushless D.C. motor having an abnormal driving current cut-off circuit according to an alternative embodiment of the present invention.

Referring next to FIG. 2 which shows an alternative embodiment of the present invention, an abnormal driving current cut-off circuit SFC2 is provided in the same manner as an abnormal driving current cut-off circuit SFC1 in the foregoing preferred embodiment. Output terminals $\phi 1$, $\phi 2$ and $\phi 3$ of the three-phase logic LC are connected to input terminals of two-input AND gates AND1, AND2 and AND3, respectively. Output terminals of the two-input AND gates AND1, AND2 and AND3 are connected to input terminals of three-input OR gate OR.

An output terminal of the three-input OR gate OR is connected to an input terminal of a NOT gate NOT, and an output terminal of the NOT gate NOT is connected to the base of an NPN type transistor TR5. A power supply +B for supplying a driving power to each of stator coils is connected to a collector of the transistor TR5, while a neutral connecting point NP of each of the stator coils SC is connected to the emitter of the transistor TR5.

In an abnormal driving current cut-off circuit SFC2 as mentioned above, when an external noise affects the three-phase logic LC, and driving signals are simultaneously output from plural output terminals of the output terminals $\phi 1$, $\phi 2$ and $\phi 3$ of the three-phase logic LC, at least one of the two-input AND gates AND1, AND2 and AND3 output a logic "1" signal, and accordingly an output signal from the three-input OR gate OR becomes a logic "1" signal.

As a result, the NOT gate NOT outputs a logic "0" signal to be applied to the base of the transistor TR5. Accordingly, the transistor TR5 turns off to cut off a driving power fed from the power supply +B to the neutral connecting point NP of the stator coils SC.

When the influence of the external noise to the three-phase logic LC is eliminated normal, driving current is sequentially fed to each of the stator coils at a normal timing.

Having thus described the preferred embodiment of the invention, it should be understood that numerous structural modifications and adaptations may be made without departing from the spirit of the invention.

What is claimed is:

1. In a brushless three phase D.C. motor having a plurality of stator coils for driving a rotor, circuit means for generating a rotating magnetic field in said stator coils, said circuit means including a common D.C. power supply connected to said stator coils, stator switching means in circuit with each stator coil to energize and deenergize said stator coils, and a drive control circuit responsive to rotor position for generating switching signals for operating said stator switching means in a predetermined serial phase sequence for generating said rotating magnetic field, the improvement comprising, a motor protection circuit coupled to said drive control circuit to sense any spurious simultaneously generated switching signals, said motor protection circuit including protective switching means operable to interrupt current flow to said stator coils upon said motor protection circuit sensing any of said spurious simultaneous signals and a logic circuit comprising three AND gates and an output OR gate, said AND gates being connected to said drive control circuit to sense the said spurious simultaneous signals, said stator switching means and said protective switching means comprise transistors, the output of said logic circuit being connected to said protective switching transistor to deenergize said stator coils upon sensing of said simultaneous signals, and wherein the collector of said protective switching transistor is connected to said D.C. power supply while the emitter thereof is connected to said stator coils, the output of said logic circuit being connected to a NOT gate in circuit with the base of said protective switching transistor whereby the sensing of simultaneous signals in the drive control circuit results in the logic circuit turning the protective switching transistor "off" thereby interrupting the power supply to said motor.

2. The combination of claim 1 wherein said protective switching means is in series circuit relationship with said common D.C. power supply and when operable by said motor protection circuit interrupts power to said stator coils.

* * * * *